United States Patent
Wu et al.

(10) Patent No.: US 7,251,671 B2
(45) Date of Patent: Jul. 31, 2007

(54) METHOD AND SYSTEM FOR GARBAGE COLLECTION WHEREIN RESETTING THE MARK/ALLOCATION BIT, AND SWITCHING THE MARK/ALLOCATION BIT TO THE MARK BIT TO PERFORM MARKING AND SCANNING OF OBJECTS USING THE IDENTIFIED OBJECT AS A ROOT OBJECT AND PROVIDING MARK/ALLOCATION BIT INFORMATION BEING DISPLAYED AT THE CLIENT

(75) Inventors: Gansha Wu, Beijing (CN); Xin Zhou, Beijing (CN); Guei-Yuan Lueh, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 494 days.

(21) Appl. No.: 10/810,164

(22) Filed: Mar. 26, 2004

(65) Prior Publication Data

US 2005/0216539 A1    Sep. 29, 2005

(51) Int. Cl.
*G06F 17/30*    (2006.01)
*G06F 17/00*    (2006.01)
*G06F 9/45*    (2006.01)
*G06F 13/28*    (2006.01)

(52) U.S. Cl. .................. 707/206; 707/103 R; 717/148; 711/159; 711/170

(58) Field of Classification Search ................ 707/1–3, 707/6, 100, 102, 103 Z, 200, 205–206, 103 R–103 Y; 711/2, 203, 206, 147, 159, 170; 710/23, 710/28; 717/108, 116, 118, 148; 709/203
See application file for complete search history.

(56) References Cited

U.S. PATENT DOCUMENTS

| | | | |
|---|---|---|---|
| 5,699,539 A | * | 12/1997 | Garber et al. .................. 711/2 |
| 6,093,216 A | * | 7/2000 | Adl-Tabatabai et al. .... 717/128 |
| 6,317,869 B1 | * | 11/2001 | Adl-Tabatabai et al. .... 717/132 |
| 6,324,631 B1 | * | 11/2001 | Kuiper ........................ 711/170 |
| 6,339,779 B1 | * | 1/2002 | Houldsworth ............... 707/206 |
| 6,560,619 B1 | * | 5/2003 | Flood et al. ................ 707/206 |

(Continued)

FOREIGN PATENT DOCUMENTS

GB    2349719    * 11/2000 ...................... 12/2

(Continued)

OTHER PUBLICATIONS

Katherine Barabash et al. "Mostly accurate stack scanning", proceedings of the Java virtual machine research and technology symposium (JVM'01), 2001.*

(Continued)

*Primary Examiner*—Srirama Channavajjala
(74) *Attorney, Agent, or Firm*—Blakely, Sokoloff, Taylor & Zafman LLP

(57) ABSTRACT

A method, apparatus, and system are provided for integrating mark bits and allocation bits. According to one embodiment, a single space is allocated for accommodating a mark bit and an allocation bit. The mark bit and the allocation bit are integrated into a mark/allocation bit using the single space allocated. The mark/allocation bit then used to correspond to an object in a heap.

11 Claims, 8 Drawing Sheets

U.S. PATENT DOCUMENTS

| | | | |
|---|---|---|---|
| 6,567,905 B2 * | 5/2003 | Otis | 711/170 |
| 6,598,141 B1 * | 7/2003 | Dussud et al. | 711/170 |
| 6,622,226 B1 * | 9/2003 | Dussud | 711/159 |
| 6,763,440 B1 * | 7/2004 | Traversat et al. | 711/159 |
| 6,865,657 B1 * | 3/2005 | Traversat et al. | 711/170 |
| 7,089,273 B2 * | 8/2006 | Wu et al. | 707/206 |
| 7,174,354 B2 * | 2/2007 | Andreasson | 707/206 |
| 2002/0055941 A1 * | 5/2002 | Kolodner et al. | 707/200 |
| 2002/0056019 A1 * | 5/2002 | Kolodner et al. | 711/6 |
| 2002/0099765 A1 * | 7/2002 | Otis | 709/203 |
| 2003/0200392 A1 * | 10/2003 | Wright et al. | 711/118 |
| 2005/0246402 A1 * | 11/2005 | Wu et al. | 707/205 |
| 2005/0273567 A1 * | 12/2005 | Blandy | 711/170 |
| 2006/0031810 A1 * | 2/2006 | Peng et al. | 717/100 |
| 2006/0173939 A1 * | 8/2006 | Yin et al. | 707/206 |

FOREIGN PATENT DOCUMENTS

| | | | | |
|---|---|---|---|---|
| WO | WO 99/64955 | * | 12/1999 | 12/2 |
| WO | WO 00/60468 | * | 10/2000 | 12/2 |
| WO | WO 01/73556 | * | 10/2001 | 12/2 |
| WO | WO 01/97042 | * | 12/2001 | 12/2 |
| WO | WO 02/23345 | * | 3/2002 | |
| WO | WO 2005/013134 | * | 2/2005 | 12/2 |
| WO | WO 2005013134 | * | 2/2005 | 12/2 |

OTHER PUBLICATIONS

Qian Yang et al. "java virtual machine timing probes: a study of object life span and garbage collection",IEEE internation performance, computing, and communications conference, 2002, pp. 73080.*

Michal cierniak et al. "open runtime platform: flexibility with performance using interfaces", JGI'02, Nov. 2002, pp. 156-164.*

Christian Wirth, "incremental garbage collection: the basic algorithms", Jan. 2006, pp. 1-16.*

Srisa-an W et al. "active memory processor: a hardware garbage collector for real-time Java embedded devices", Mobile computing, IEEE transactions, vol. 2, issue: 2, 2003, pp. 89-101.*

Yamamoto,K et al. "distributed persistent object system with uniform representation of pointers and its garbage collection", proceedings of the twenty-ninth Hawaii internatinal conference on system sciences, 1996, vol. 1, pp. 12-21.*

Maheshwari,U et al. "fault-tolerant distributed garbage collection in a client-server object-oriented database", proceedings of the third international conference on parallel and distributed information systems, 1994, pp. 239-248.*

Sam Borman, "Sensible Sanitation—Understanding the IBM Java Garbage Collector, Part 1: Object Allocation", Aug. 2002, 8 Pages, http://www-106.ibm.com/develperworks/ibm/library/i-garbage1/.

* cited by examiner

METHOD AND SYSTEM FOR GARBAGE COLLECTION WHEREIN RESETTING THE MARK/ALLOCATION BIT, AND SWITCHING THE MARK/ALLOCATION BIT TO THE MARK BIT TO PERFORM MARKING AND SCANNING OF OBJECTS USING THE IDENTIFIED OBJECT AS A ROOT OBJECT AND PROVIDING MARK/ALLOCATION BIT INFORMATION BEING DISPLAYED AT THE CLIENT

BACKGROUND OF THE INVENTION

1. Field of the Invention

This invention relates generally to memory management. More particularly, an embodiment of the present invention relates to integration of mark bits and allocation bits in garbage collectors.

2. Description of Related Art

Memory management-related problems, such as memory waste, are fairly common in modern computer systems. Such problems often lead to other problems, including excessive memory usage, performance loss, and even application failures in the computer system. To reduce such memory management-related problems, most computer systems employ garbage collection.

Garbage collection typically involves a software routine to search memory for space of unused data and to reclaim and use such space for the general memory pool called the heap. The heap refers to a common pool of memory that is available to the program. Managing the heap is typically done by allocation and deallocation of memory for objects within the heap. Many computer systems employ mark-sweep based garbage collectors 100, such as the one illustrated in FIG. 1A.

The mark-sweep based garbage collector (garbage collector) 100 includes a heap 102 and adopts mark-sweep algorithm requiring a relatively large space for a set of mark bits (or M bits) 104 having mark bits 106-108. Typically, a mark bit 106-108 is proportional to approximately 4 bytes of an object 110-112 of the heap 102. However, the mark bits 106-108 only coincidently refer to the objects 110-112 of the heap 102. To help solve this problem by clarifying whether an integer value does refer to a legitimate or living object 110-112, a mark-sweep based conservative garbage collector (conservative garbage collector) 120, as illustrated in FIG. 1B, is implemented. A conservative garbage collector 120 employs a set of allocation bits (or A bits) 122, in addition to having a set of mark bits 104. Typically, an allocation bit 124-126 is proportional to about 4 bytes of an object 110-112 in the heap 102. The allocation bits 124-126 are used to correspond to addresses of the objects 110-112 contained in the heap 102 to help identify the objects 110-112 and avoid spurious pointers.

Stated differently, in a conservative garbage collector 120, an allocation bits set 122, having allocation bits 124-126, is added to dynamically record addresses of the living objects 110-112. However, the dynamic recording of the addresses using the conservative garbage collector 120 requires maintaining an extra space for each of the allocation bits 124-126 at a relatively high runtime computing cost. The term "conservatism" refers to the conservative garbage collector 120 being conservative in treating integer values on the stack or in the heap 102 or other areas, such as registers, as spurious pointers.

The conservative garbage collector 120, bundled with the garbage collector 100, is a frequently deployed system today to simplify runtime design. However, the design dilemma to employ both the mark-sweep based algorithm and conservative features is overwhelming for most systems, particularly for small systems. The extra space and time overhead of having both the mark-bits 106-108 and the allocation-bits 124-126 is undesirable for small systems and for most systems with limited memory and computation power.

BRIEF DESCRIPTION OF THE DRAWINGS

The appended claims set forth the features of the present invention with particularity. The embodiments of the present invention, together with its advantages, may be best understood from the following detailed description taken in conjunction with the accompanying drawings of which:

DETAILED DESCRIPTION

Figure 1A:
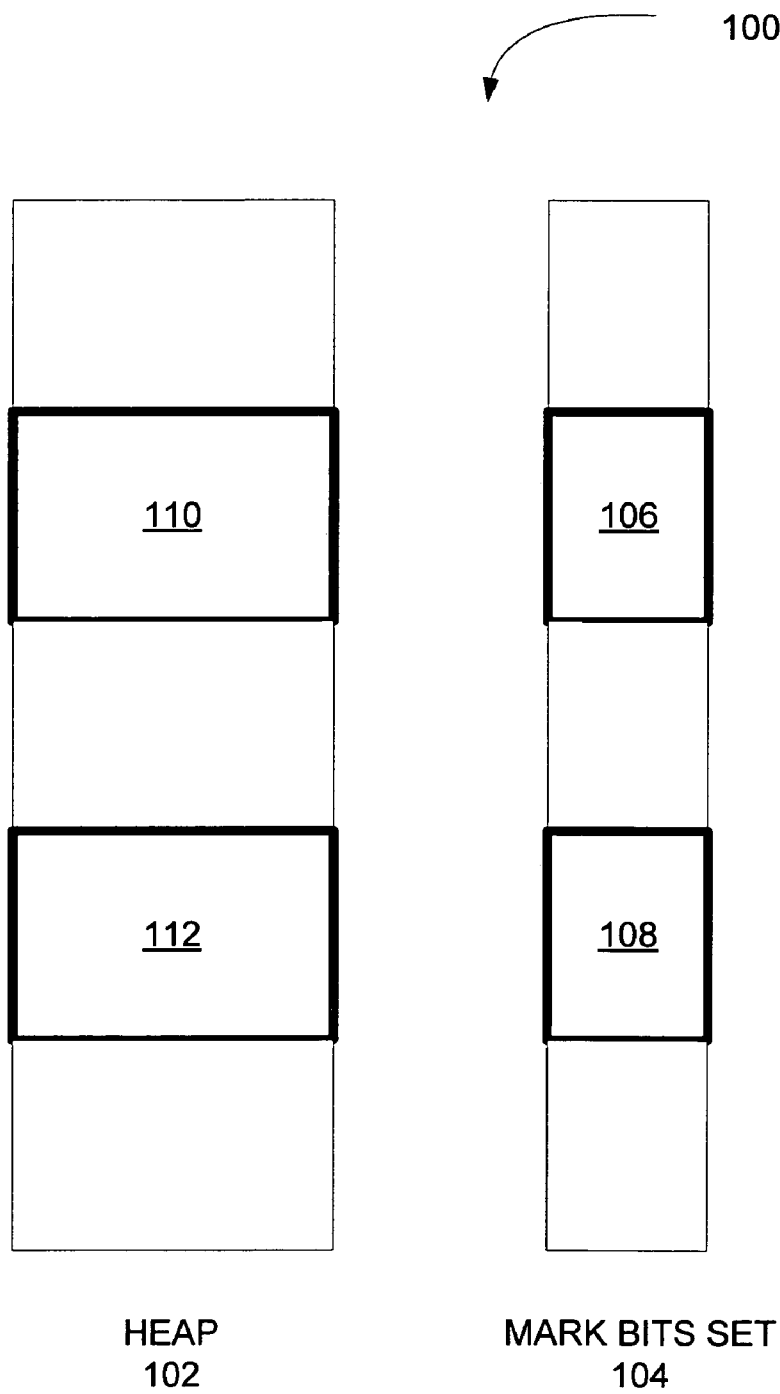
FIG. 1A is a block diagram illustrating a prior art mark-sweep based garbage collector.
Figure 1B:
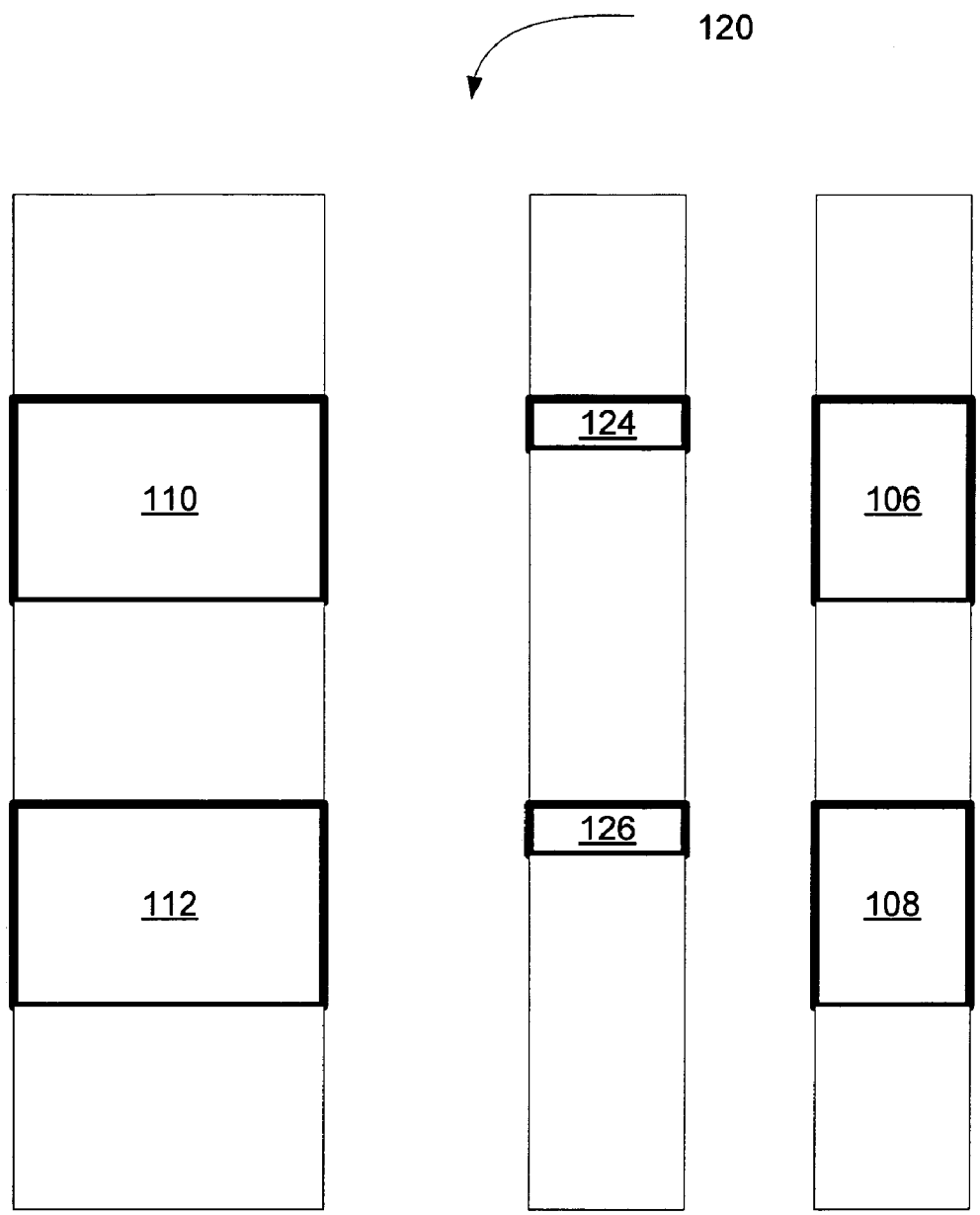
FIG. 1B is a block diagram illustrating a prior art mark-sweep based conservative garbage collector.

A method and apparatus are described for integrating a mark bit and an allocation bit into a single space. Embodiments of the present invention provide for integration of mark bits and allocation bits into mark/allocation bits in mark-sweep based conservative garbage collectors.

According to one embodiment, a single space is allocated to accommodate both a mark bit and an allocation bit. For example, in a mark-sweep based conservative garbage collector, a single bit may be used to accommodate both a mark bit and an allocation bit as the mark/allocation bit. Each of the mark/allocation bits in a mark/allocation bits set may be used to correspond to live objects in a heap to identify, mark, and scan the objects of the heap. According to one embodiment, although a single space is allocated, both the mark bit and the allocation bit of the mark/allocation bit perform their respective functions by alternating between the mark bit and the allocation bit, as necessary.

According to one embodiment, a lazy and selective approach to generate allocation bits during the root set enumeration phase is employed. For example, a heap may be divided into various segments with each segment having various living objects. The lazy and selective approach helps defer the setting of allocation bits from the allocation phase to the root set enumeration phase. It also helps selectively generate allocation bits for those objects in the segments to which spurious pointers are pointed. Stated differently, the allocation bits are generated for selected segments (with living objects) and not for the entire heap, saving the system from unnecessarily generating the allocation bits and wasting valuable resources that can be used for other purposes.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions.

Figure 2:
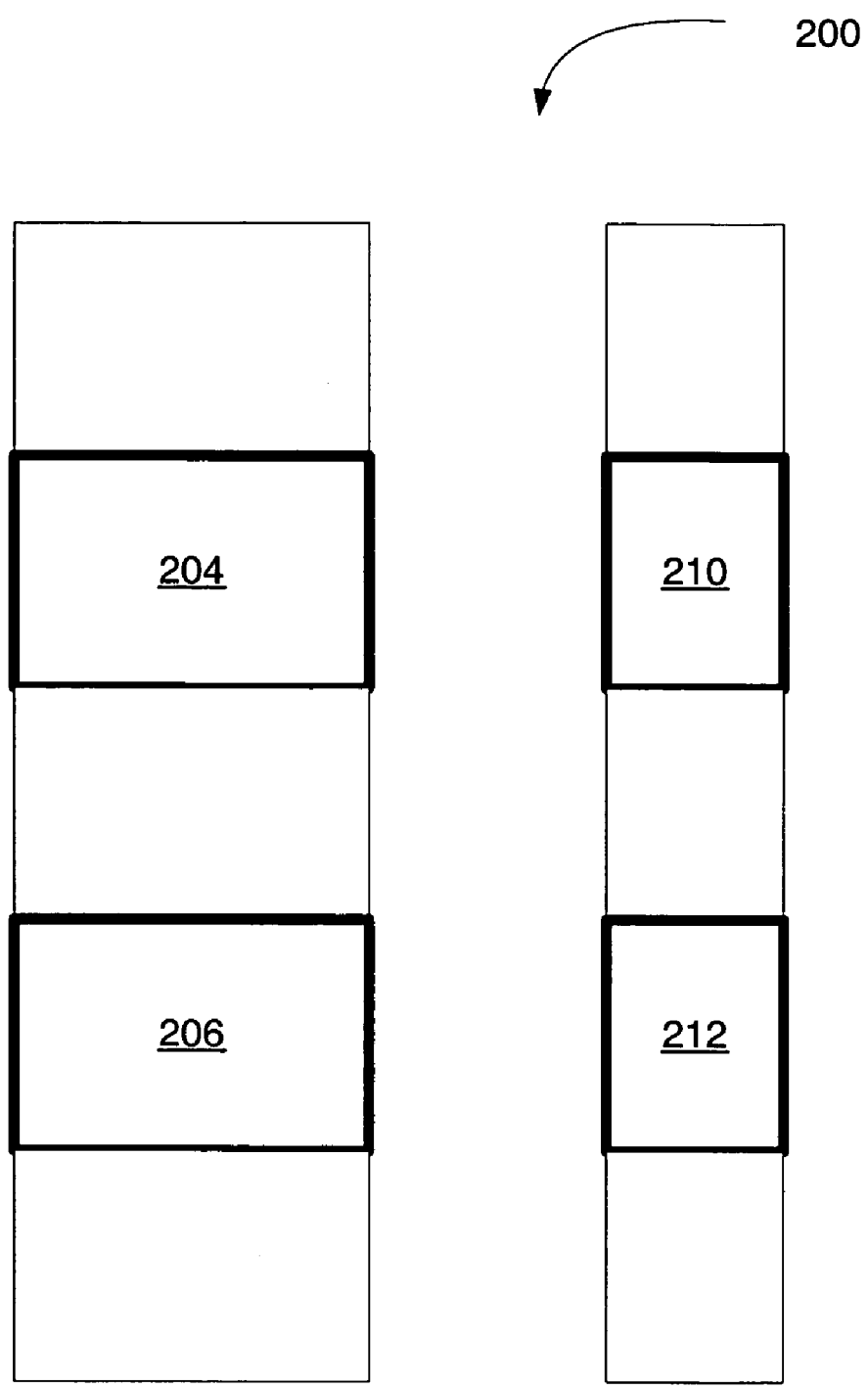
FIG. 2 is a block diagram illustrating an embodiment of integration of mark bits and allocation bits in a mark-sweep based conservative garbage collector.

FIG. 2 is a block diagram illustrating an embodiment of integration of mark bits and allocation bits in a mark-sweep based conservative garbage collector (garbage collector) 200. According to one embodiment, as illustrated, a garbage collector 200 includes a heap 202 having a number of live objects 204-206. The garbage collector 200, according to one embodiment, also includes an integrated mark bits and allocation bits set 208 having the mark/allocation bits 210-212. According to one embodiment, to integrate mark bits and allocation bits into mark/allocation bits 210-212, a single space is allocated for holding a pair having a mark bit and an allocation bit. For example, the each of the mark/allocation bits 210-212 includes a mark bit and an allocation bit. This way, the mark/allocation bits 210-212 use relatively less space than having individual spaces allocated for each of the mark bits and the allocation bits. Although integrated, each of the mark bits and the allocation bits in the mark/allocation bits 210-212 performs its expected functions.

Although the total size of the mark/allocation bits set 208 may be proportional to the size of the heap 202, according to on embodiment, only the mark/allocation bits 210-212 corresponding to living objects 204-206 in the heap 202 may be set. Furthermore, the setting of the mark bits of the mark/allocation bits 210-212 may be different from the setting of the allocation bits of the mark/allocation bits 210-212. For example, one mark/allocation bit 210 corresponds to a heap object 204. For mark bits, the mark bits corresponding to each of the 4-byte units of the object 204 are set; while, for allocation bits, the allocation bit corresponding to the starting address of the object 204 (e.g., the first 4 bytes of the object) is set. Stated differently, marks bits are used to claim a contiguous space corresponding to an object 204, while allocation bits are used to indicate the starting address that points to an object 204 or its range.

Initially, the mark bits are cleared or unmarked, and once an object 204-206 is identified in the heap 202, during an initial scanning period (e.g., runtime bootstrapping phase), its associated or corresponding mark bits is marked. Once an object 204-206 is successfully allocated in the heap 202, an allocation bit is set and mapped to the starting address of the allocated object 204-206. During the non-garbage collection cycle (e.g., allocation phase), the mark/allocation bits 210, 212, although allocated to a single space 210, 212, behave or act as allocation bits to perform the allocation bits-related functions. For example, the mark/allocation bits 210, 212 are set as allocation bits as objects 204, 206 in the heap 202 are created.

Both the mark bits and the allocation bits of the mark/allocation bits 210-212 may perform their respective functions independent of each other and without overlapping. For example, the mark/allocation bit 210 may act as an allocation bit to perform the allocation bit-related functions without an interference from the mark bit, and vice versa. The mark/allocation bits set 208, having both the mark bits and the allocation bits in one space, such as the mark/allocation bits 210-212, helps leave free space for other uses for the system, and still facilitates performing individual functions of the mark and allocation bits. For example, using the mark/allocation bit 210, one or more mark bits may be used to mark the corresponding object 204 in the heap 202, while an allocation bit may be used to identify the starting address of the object 204 or interior pointers within the boundaries of the object 204 in the heap 202.

According to one embodiment, the allocation of one space, and the integration of both a mark bit and an allocation into that space, may be performed by an algorithm using a programming or runtime system. For example, for Java programs, the programming or runtime system may refer to the Java™ Virtual Machine (JVM) runtime environment. Microsoft® .NET platform may use the Common Language Runtime (CLR) to compile .NET applications into machine language before executing them.

The garbage collection cycle then starts with the process of root set enumeration. During the garbage collection cycle's root set enumeration phase, each of the root candidates is checked and added to the root set if its pointer-like value maps to the starting address (or range) of an object 204-206 (e.g., pointing to the starting address where the allocation bit is set). Before the end of the garbage collection cycle, the allocation bits may be re-assigned for the surviving objects 204-206.

The root set enumeration phase may involve a set of objects 204-206 of which one or more objects 204 may serve as the root object and other elements or objects 206 are referred to by that one root object 204. It is contemplated that there may be multiple roots with multiple root objects. These roots may reside in various root areas, such as registers, call stacks, and the heap 202. According to one embodiment, a root enumeration subsystem may scan these root areas to identify legitimate root objects as indicated by spurious pointers. A root enumeration subsystem may consult with the mark/allocation bits 210-212 for pointer identification. For example, the mark/allocation bits 210-212, behaving as allocation bits, may be used for conservative pointer identification for each integer value in the root areas. An integer may refer to a 1 or 0 or may refer to a pointer.

According to one embodiment, once the root enumeration process is concluded, the mark/allocation bits 210-212 may switch their role to act as mark bits. Before switching to their new role, the mark/allocation bits 210, 212 (e.g., the space allocated for mark/allocation bits 210-212) may once again be cleared or unmarked. The clearing of the space may be performed to avoid incorrect observations about the objects 204-206 as to whether they are the living objects or not. The mark/allocation bits 210, 212 may then behave as mark bits to perform the process of mark/scan. For example, the root object 204 may be marked and other objects 206 referred to by that root object 204 may be marked and scanned as part of the mark/scan process, which then leads to mark bits being associated with their corresponding living objects 204-206 that are marked and retained.

Once the mark/scan process has concluded (e.g., during the garbage collection-pause time), the space for mark/allocation bits 210-212 may then be used for other unrelated purposes, such as for break table indexer to facilitate compaction. According to one embodiment, nearing the garbage collection wrap-up point, the mark/allocation bits 210-212 are cleared again and the allocation bits for retained objects 204-206 are re-generated. During the runtime or allocation phase, the mark/allocation bits 210-212 may act as allocation bits, and during the garbage collection phase or mark/scan phase of garbage collection, the mark/allocation bits 210-212 may act as mark bits.

It is to be appreciated that the layout of the garbage collector 200 may be different depending on various factors, including system capabilities. For example, in some systems, the mark/allocation bits set 208 may be part of the heap 202 and/or the mark/allocation bits 210-212 may not be contiguous.

Figure 3:
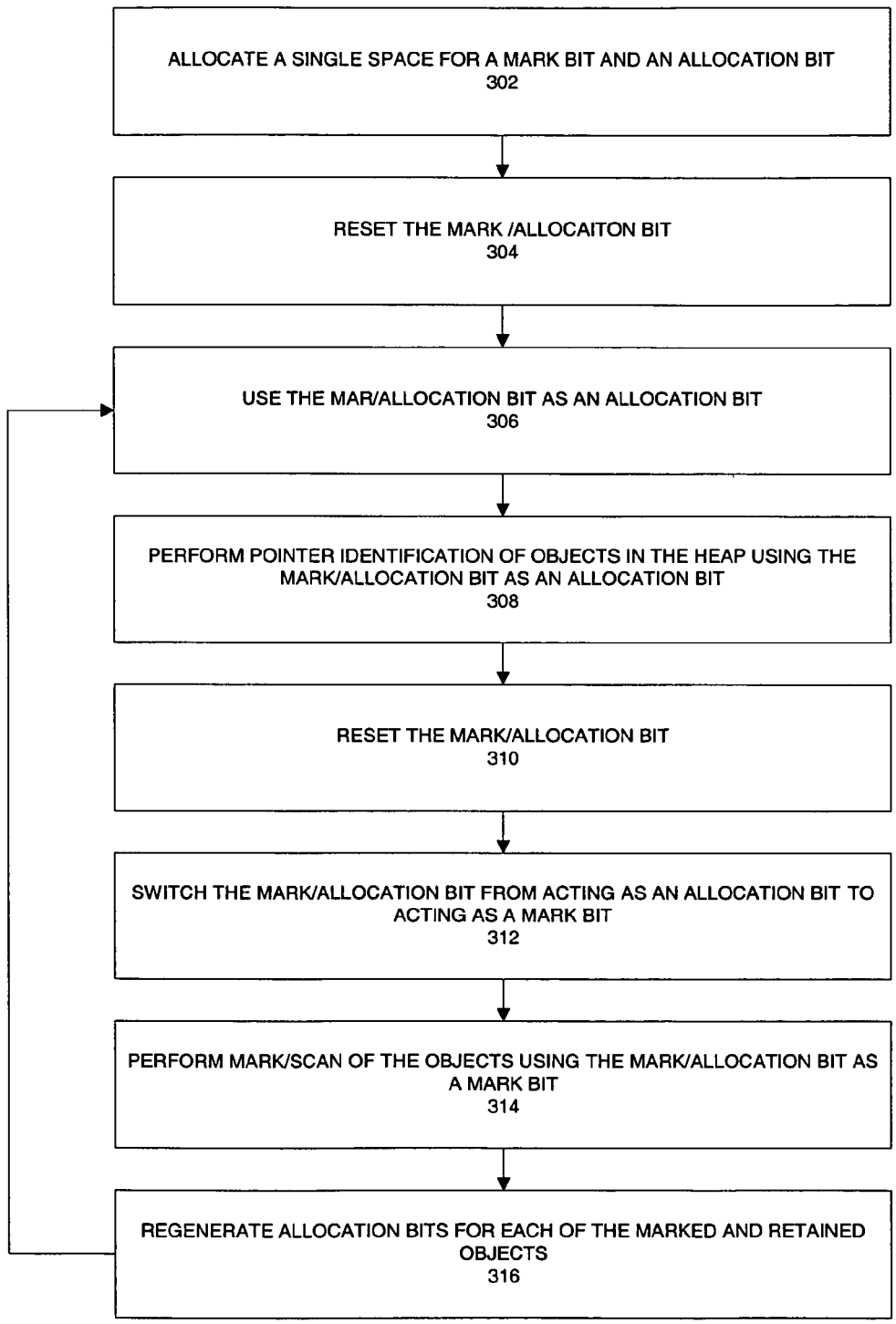
FIG. 3 is a flow diagram illustrating an embodiment of a process for integration of mark bits and allocation bits in a mark-sweep based conservative garbage collector.

FIG. 3 is a flow diagram illustrating an embodiment of a process for integration of mark bits and allocation bits in a mark-sweep based conservative garbage collector (garbage collector). According to one embodiment, a single space (e.g., a bit) is allocated for a pair of a mark bit and an allocation bit (mark/allocation bit) corresponding to an object (e.g., 4 bytes) a heap at processing block 302. It is contemplated that a set of mark/allocation bits may include multiple pairs of mark bits and allocation bits corresponding to multiple objects in the heap.

The mark/allocation bit may be cleared or unmarked at an initial scanning period (e.g., runtime bootstrapping phase) at processing block 304. After the clearance, the mark/allocation bit works as an allocation bit, for example, during the allocation phase of the non-garbage collection cycles at processing block 306. The mark/allocation bit, acting as an allocation bit, may perform pointer identification of the corresponding object in the heap during the garbage collection cycle's root set enumeration phase at processing block 308. At the conclusion of the root set enumeration phase, the mark/allocation bit may again be cleared at processing block 310.

According to one embodiment, the mark/allocation bit is then converted to act as a mark bit to perform mark bit-related functions at processing block 312. The mark/allocation bit, acting as a mark bit, may then be used to perform the mark/scan process at processing block 314. The mark/scan process is used to mark the corresponding root object of the living objects in the heap, and mark and scan other objects referred to by the root object. Nearing the garbage collection wrap-up (e.g., the garbage collection pause-time), the mark/allocation bit may be used for other non-related system purposes. At processing block 316, the mark/allocation bit may be regenerated as an allocation bit corresponding to each of the marked and retained objects. Once the allocation bits are regenerated for the marked and retained objects, the process may continue with processing block 306 as the mark/allocation bit acts as an allocation bit.

Figure 4:
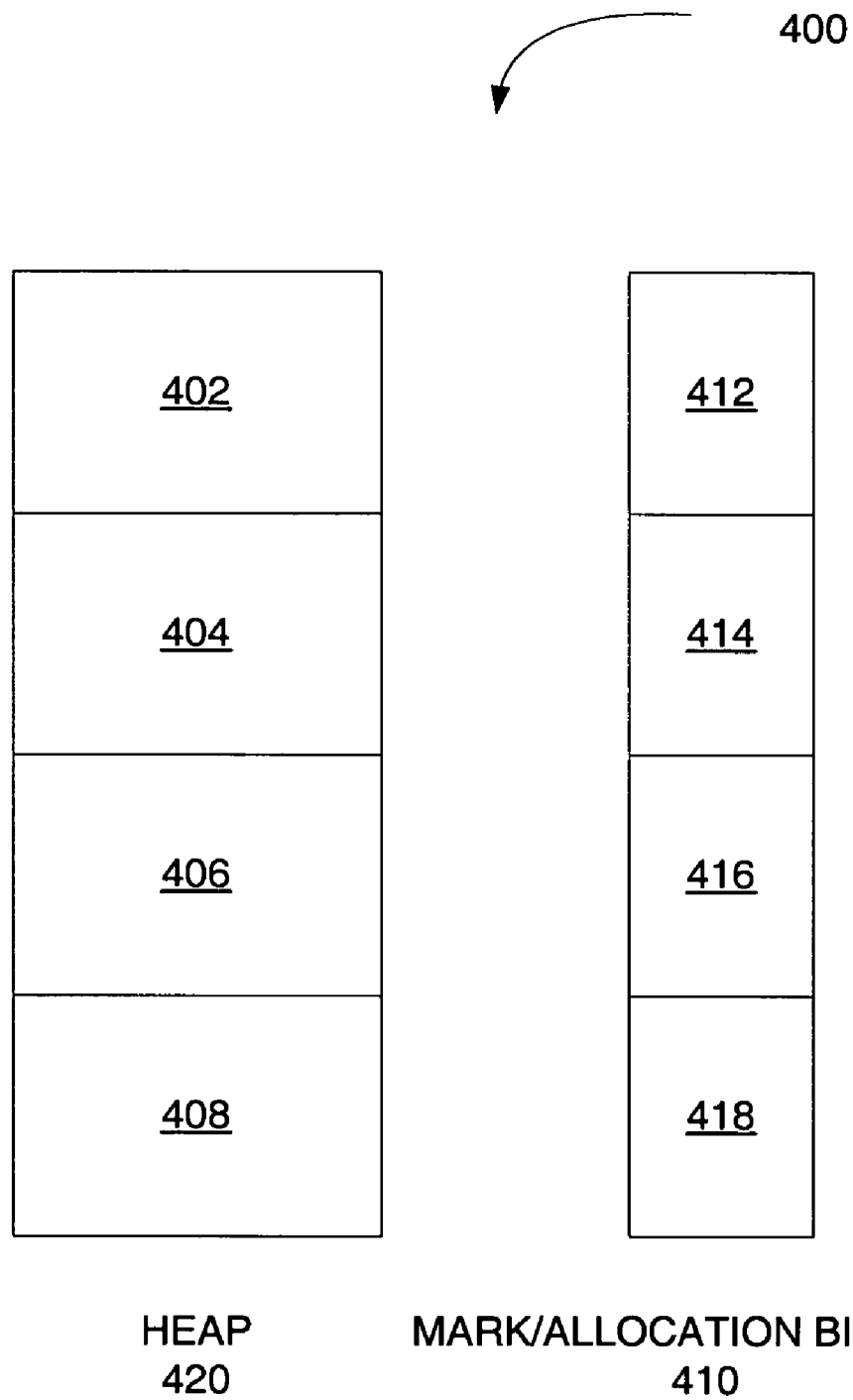
FIG. 4 is a block diagram illustrating an embodiment of a hierarchical heap organization for lazy and selective allocation bits generation in a mark-sweep based conservative garbage collector.

FIG. 4 is a block diagram illustrating an embodiment of a hierarchical heap organization for lazy and selective allocation bits generation in a mark-sweep based conservative garbage collector (garbage collector) 400. The allocation bits may be used during the root set enumeration phase, and a limited subset of allocation bits may be queried due to the relatively small size of root sets. According to one embodiment, the lazy and selective allocation bits generation (lazy and selective generation) may be used to reduce the need for setting or generating all allocation bits for each of the corresponding objects (e.g., the entire heap 420) at runtime. The lazy and selective generation may be achieved by deterring the setting of the allocation bits from the allocation phase to the root enumeration phase and by reducing the production of the allocation bits by, for example, producing the allocation bits on demand. According to one embodiment, by using the lazy and selective generation for the root set enumeration phase, there may not be a need for walking the entire heap 420 to generate all the allocation bits in the mark/allocation bit set 410 corresponding to each of the live objects of the heap 420.

According to one embodiment, a heap 420 may be divided into various segments 402-408, as illustrated, and certain segments 402-408 of the heap 420 may be selected for which the allocation bits are generated. Once the heap 420 has been divided into segments 402-408, the direction of a spurious pointer may be examined to determine which segment or segments 402-408 of the heap 420 are being pointed. For example, if only segment 406 of segments 402-408 is being pointed to, the allocation bits are generated for only the live objects of segment 406 and not for segments 402-404, 408. Stated differently, only the mark/allocation bits 416 corresponding to segment 406 of the heap 420 may be converted into allocation bits for the live objects of segment 406.

Furthermore, the lazy and selective generation may be used for integer values that point to a particular segment (e.g., segment 406) of the heap 420, and the rest of the integer values may be ignored. It is contemplated that certain integer values or pointer directions may not require generation or regeneration of the allocation bits, such as if the integer value is 0, the integer is not likely to be a pointer and, if a pointer points outside of the heap 420, it is not likely to correspond to any of the segments 402-408 and thus, not likely to correspond to any of the live objects contained in those segments 402-408.

According to one embodiment, with the hierarchical division of the heap 420 into various segments 402-408, with each segment processing a subset of mark/allocation bits 412-418, the garbage collector 400 may perform its tasks at a relatively small scale and keep computation complexity below an acceptable level. Further, according to one embodiment, the lazy and selective generation (also referred to as the divide and conquer system) may be used for detecting and verifying object root candidates to be added to the root set. For example, segment 406, for which the allocation bits are to be generated, is located. Then, if the pointer points or corresponds to the starting address of an object in segment 406, that object is added to the root set. If the pointer points to an interior position in the object (e.g., somewhere other than at the starting address of the object), the pointer may be calibrated to the starting address of the object. Once the calibration is completed and the pointer points to the starting address of the object, that object is then added to the root set.

The lazy and selective generation may be used to help reduce runtime memory accesses and computations cycles in a system. The lazy and selective generation may also be used to help reduce the overhead for clearing and resetting of the mark/allocation bits 412-418, which may be regarded as heavyweight in various architectures, such as Advanced Reduced instruction set computer Machine (ARM) and Xscale™. Furthermore, the lazy and selective generation may also help reduce the garbage collector pause-time (e.g., stop the whole world) and thus, help reduce the user response time.

Figure 5:
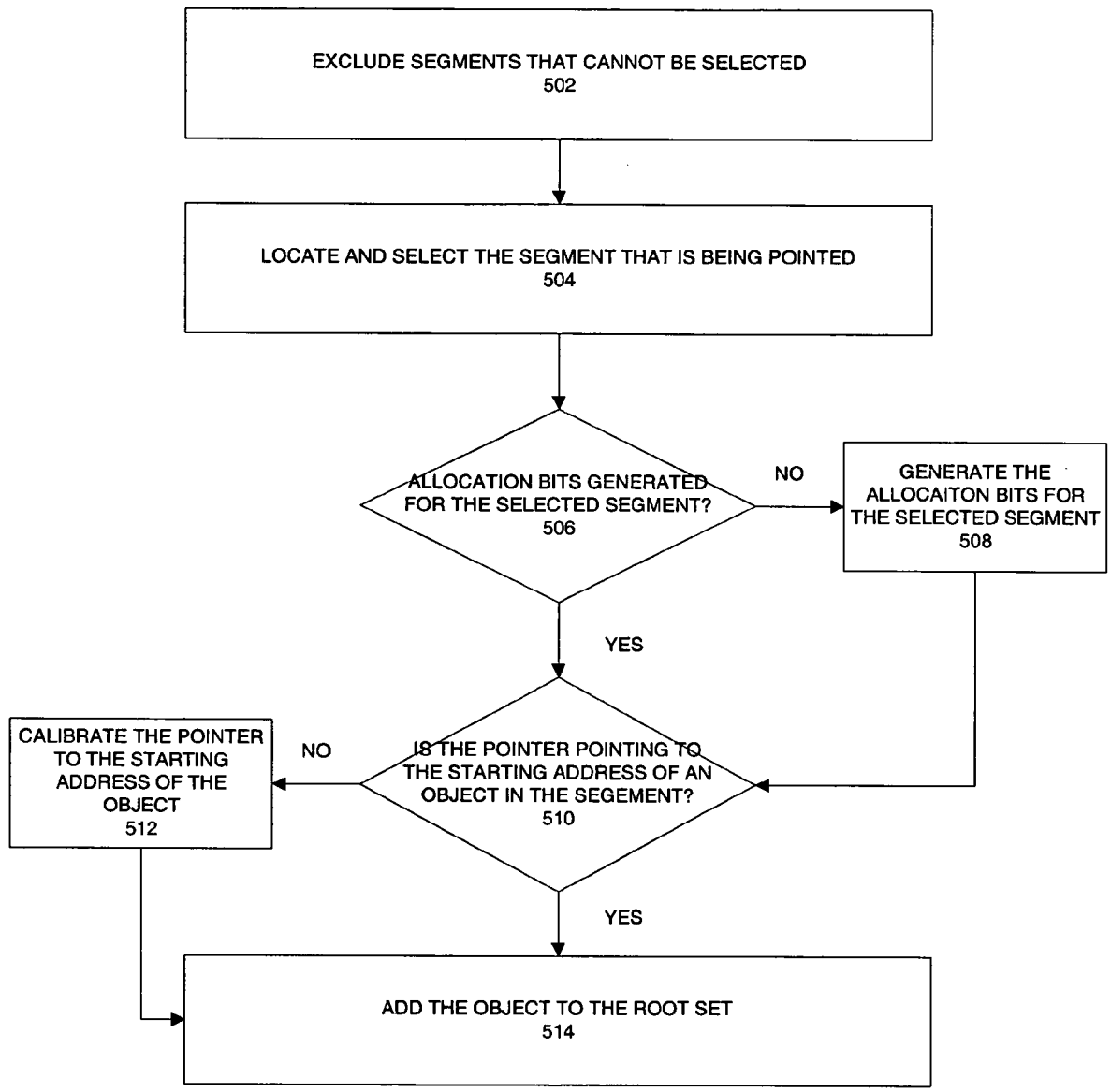
FIG. 5 is a flow diagram illustrating an embodiment of a process for lazy and selective allocation bits generation in a mark-sweep based conservative garbage collector.

FIG. 5 is a flow diagram illustrating an embodiment of a process for lazy and selective allocation bits generation in a mark-sweep based conservative garbage collector (garbage collector). First, any roots (e.g., any segments or objects in a segment or integer values) that are not pointer-like or cannot be pointed to are excluded at processing block 502. Stated differently, for example, any segment that may not be pointed to for any reason is excluded from consideration for the lazy and selective generation. The segment of the heap that is pointed to and for which allocation bits are to be generated is selected at processing block 504. The pointed segment or the address of the pointed segment may be located in the heap by observing the identification pointer. According to one embodiment, the generation of the allocation bits may include or refer to converting the mark/allocation bits into allocation bits to perform allocation bits-related functions.

At decision block 506, a determination is made as to whether the allocation bits have already been generated corresponding to the located segment. If the allocation bits have not yet been generated, they are generated for the selected segment at processing block 508. If the allocation bits have already been generated, the process continues at decision block 510 with the root verification to determine whether the starting address or the interior of an object in the segment is being pointed. Stated differently, a determination is made as to whether the identification pointer points to the starting address of an object in the located segment or to the inside of the object.

If the inside the object in being pointed to by the pointer, the pointer is calibrated to the starting address of the object at processing block 512. Once the starting address of the object is determined and is being pointed to by calibrating the pointer, the object is then added to a root set at processing block 514. The root set may have multiple root addresses as multiple objects may be marked, scanned, and retained in the root set. According to one embodiment, the allocation bits may be regarded as location bits for locating the root in performing the lazy and selective generation. It is contemplated that the lazy and selective generation may not be limited to garbage collectors, but may also be used with other processes in which allocations bits may be used.

Figure 6:
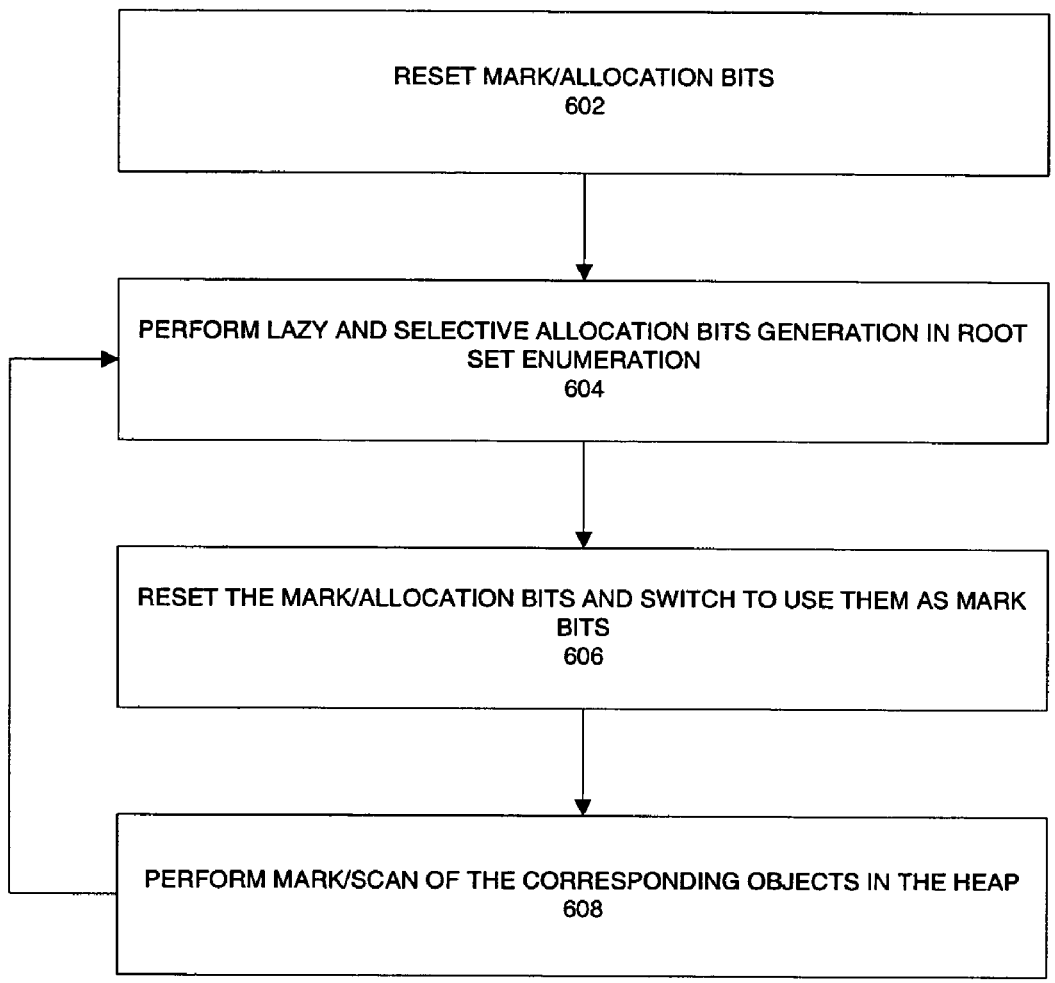
FIG. 6 is a flow diagram illustrating an embodiment of a process for managing a single space in a garbage collection cycle for a mark-sweep based conservative garbage collector.

FIG. 6 is a flow diagram illustrating an embodiment of a process for managing a single space in a garbage collection cycle for a mark-sweep based conservative garbage collector (garbage collector). First, the mark/allocation bits are cleared or reset at the initial (runtime bootstrapping) phase at processing block 602. Once the garbage collection cycle starts with the root set enumeration phase, the lazy and selective allocation (or location) bits generation (lazy and selective generation) may be performed at processing block 604.

According to one embodiment, the lazy and selective generation may include lazily and selectively choosing one or more segments of the heap that are pointed to and for which the allocation bits have to be generated. The generation of the allocation bits may refer to converting the mark/allocation bits into the allocation bits. At processing block 606, the root set enumeration phase is over, and the mark/allocation bits are cleared and then switched to mark bits. Using the mark/allocation bits as mark bits, the mark and scan of the objects in the selected segments is performed at processing block 608. Once the mark/scan process of the objects has completed, the process may continue with the performing of the lazy and selective generation at processing block 604 as the next garbage collection cycle commences.

Figure 7:
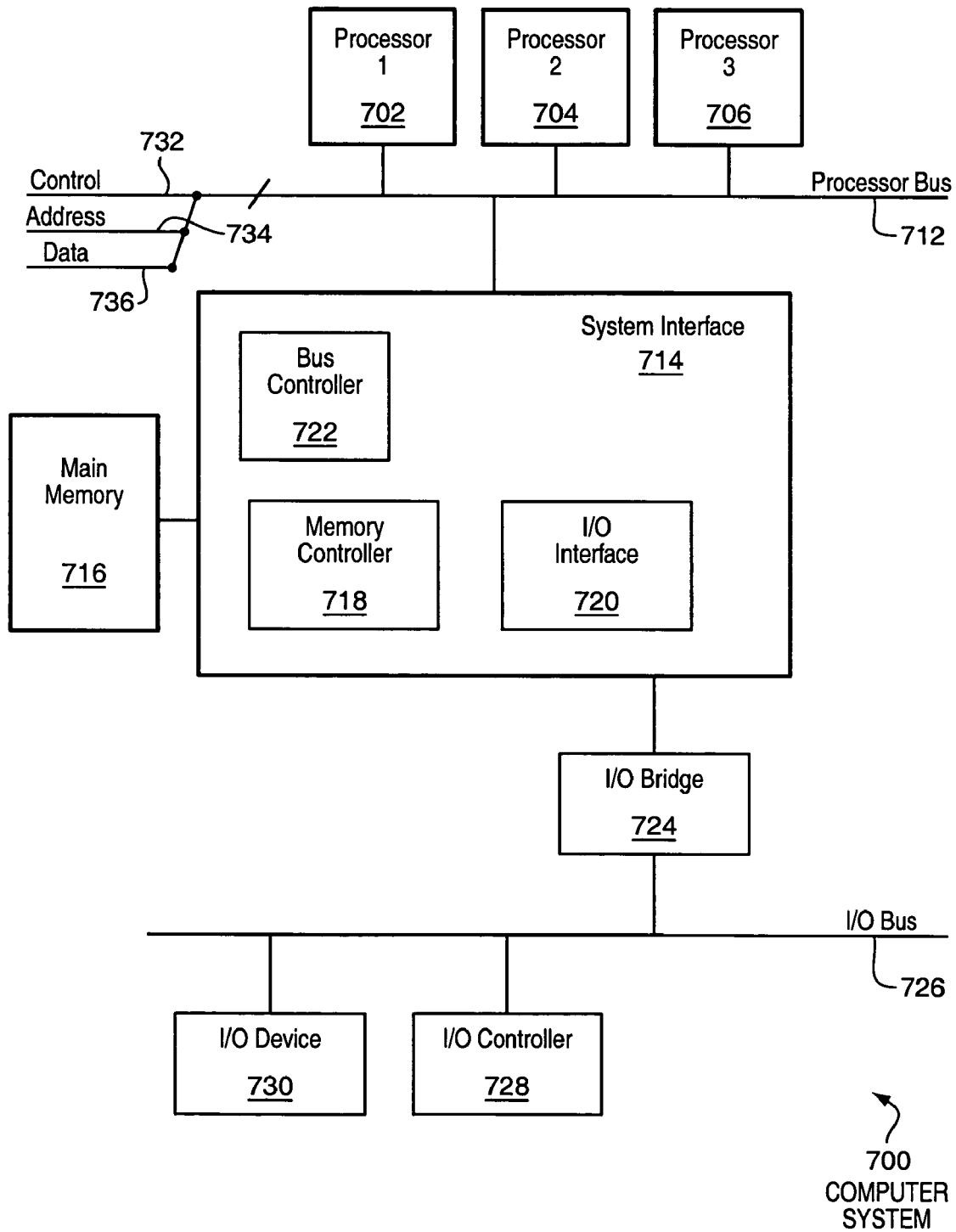
FIG. 7 is a block diagram illustrating an exemplary computer system used in implementing one or more embodiments of the present invention.

FIG. 7 is a block diagram illustrating an exemplary computer system used in implementing one or more embodiments of the present invention. The computer system (system) includes one or more processors 702-706. The processors 702-706 may include one or more single-threaded or multi-threaded processors. A typical multi-threaded processor may include multiple threads or logical processors, and may be capable of processing multiple instruction sequences concurrently using its multiple threads. Processors 702-706 may also include one or more internal levels of cache (not shown) and a bus controller or bus interface unit to direct interaction with the processor bus 712.

Processor bus 712, also known as the host bus or the front side bus, may be used to couple the processors 702-706 with the system interface 714. Processor bus 712 may include a control bus 732, an address bus 734, and a data bus 736. The control bus 732, the address bus 734, and the data bus 736 may be multidrop bi-directional buses, e.g., connected to three or more bus agents, as opposed to a point-to-point bus, which may be connected only between two bus agents.

System interface 714 (or chipset) may be connected to the processor bus 712 to interface other components of the system 700 with the processor bus 712. For example, system interface 714 may include a memory controller 718 for interfacing a main memory 716 with the processor bus 712. The main memory 716 typically includes one or more memory cards and a control circuit (not shown). System interface 714 may also include an input/output (I/O) interface 720 to interface one or more I/O bridges or I/O devices with the processor bus 712. For example, as illustrated, the I/O interface 720 may interface an I/O bridge 724 with the processor bus 712. I/O bridge 724 may operate as a bus bridge to interface between the system interface 714 and an I/O bus 726. One or more I/O controllers and/or 110 devices may be connected with the I/O bus 726, such as I/O controller 728 and I/O device 730, as illustrated. I/O bus 726 may include a peripheral component interconnect (PCI) bus or other type of I/O bus.

System 700 may include a dynamic storage device, referred to as main memory 716, or a random access memory (RAM) or other devices coupled to the processor bus 712 for storing information and instructions to be executed by the processors 702-706. Main memory 716 also may be used for storing temporary variables or other intermediate information during execution of instructions by the processors 702-706. System 700 may include a read only memory (ROM) and/or other static storage device coupled to the processor bus 712 for storing static information and instructions for the processors 702-706.

Main memory 716 or dynamic storage device may include a magnetic disk or an optical disc for storing information and instructions. I/O device 730 may include a display device (not shown), such as a cathode ray tube (CRT) or liquid crystal display (LCD), for displaying information to an end user. For example, graphical and/or textual indications of installation status, time remaining in the trial period, and other information may be presented to the prospective purchaser on the display device. I/O device 730 may also include an input device (not shown), such as an alphanumeric input device, including alphanumeric and other keys for communicating information and/or command selections to the processors 702-706. Another type of user input device includes cursor control, such as a mouse, a trackball, or cursor direction keys for communicating direction information and command selections to the processors 702-706 and for controlling cursor movement on the display device.

System 700 may also include a communication device (not shown), such as a modem, a network interface card, or other well-known interface devices, such as those used for coupling to Ethernet, token ring, or other types of physical attachment for purposes of providing a communication link to support a local or wide area network, for example. Stated differently, the system 700 may be coupled with a number of clients and/or servers via a conventional network infrastructure, such as a company's Intranet and/or the Internet, for example.

It is appreciated that a lesser or more equipped system than the example described above may be desirable for certain implementations. Therefore, the configuration of system 200 may vary from implementation to implementation depending upon numerous factors, such as price constraints, performance requirements, technological improvements, and/or other circumstances.

It should be noted that, while the embodiments described herein may be performed under the control of a programmed processor, such as processors 202-206, in alternative embodiments, the embodiments may be fully or partially implemented by any programmable or hardcoded logic, such as field programmable gate arrays (FPGAs), TTL logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A method for garbage collection comprising:
   allocating a single space to accommodate a mark bit and an allocation bit, the mark bit and the allocation bit relating to garbage collection occurring at a virtual machine;
   integrating the mark bit and the allocation bit into a single mark/allocation bit at the single space to free other spaces for other system functions;
   corresponding the mark/allocation bit with an object in a heap, wherein the mark/allocation bit occupies the single space, the mark/allocation bit to perform dual functions of the mark bit and the allocation bit by alternating between the mark bit and the allocation bit via the single space;
   resetting the mark/allocation bit, and switching the mark/allocation bit to the allocation bit to perform root set enumeration, wherein the performing of the root set enumeration comprises lazy and selective root set enumeration, wherein the lazy and selective root set enumeration comprises lazily and selectively identifying the root object in a segment of the heap and regenerating the allocation bits for the root object and other objects associated with the root objects residing in the segment of the heap;
   resetting the mark/allocation bit, and switching the mark/allocation bit to the mark bit to perform marking and scanning of objects using the identified object;
   marking the identified object as a root object;
   scanning one or more objects associated with the root object by utilizing the mark/allocation bit as the mark bit;
   marking the scanned one or more objects associated with the root object; and
   providing mark/allocation bit information being displayed at the client.

2. The method of claim 1, further comprises performing the root set enumeration by utilizing the mark/allocation bit as the allocation bit to conduct pointer identification of the object in the heap.

3. The method of claim 1, further comprising:
   retaining the marked root object and the marked one or more objects associated with the root object; and
   regenerating allocation bits for the retained objects.

4. The method of claim 1, wherein the virtual machine comprises a Java virtual machine.

5. A system for garbage collection comprising:
   a client having a processor and a memory; and
   a server coupled with the client, the server having a processor and a memory, the server further having an allocation interface to allocate a single space to accommodate a mark bit and an allocation bit, the mark bit and the allocation bit relating to garbage collection occurring at a virtual machine, an integration module to integrate the mark bit and the allocation bit into a single mark/allocation bit at the single space to free other spaces for other system functions, a correspondence unit to correspond the mark/allocation bit with an object in a heap, wherein the mark/allocation bit occupies the single space, the mark/allocation bit to perform dual functions of the mark bit and the allocation bit by alternating between the mark bit and the allocation bit via the single space, a resetting routine to reset the mark/allocation bit, and a switching module to switch the mark/allocation bit to the allocation bit to perform root set enumeration, wherein the performing of the root set enumeration comprises lazy and selective root set enumeration, wherein the lazy and selective root set enumeration comprises lazily and selectively identifying the root object in a segment of the heap and regenerating the allocation bits for the root object and other objects associated with the root objects residing in the segment of the heap, the resetting routine to reset the mark/allocation bit, and the switching module to switch the mark/allocation bit to the mark bit to perform marking and scanning of objects using the identified object, a mark/scan unit to mark the identified object as a root object, to scan one or more objects associated with the root object by utilizing the mark/allocation bit as the mark bit, and to mark the scanned one or more objects associated with the root object, and providing mark/allocation bit information being displayed at the client.

6. The system of claim 5, further comprising:

a root set enumeration module to perform the root set enumeration by utilizing the mark/allocation bit as the allocation bit to conduct pointer identification of the object in the heap.

7. The system of claim 5, wherein the virtual machine comprises a Java virtual machine.

8. A machine-readable medium comprising instructions which, when executed to perform garbage collection, cause a machine to:

allocate a single space to accommodate a mark bit and an allocation bit, the mark bit and the allocation bit relating to garbage collection occurring at a virtual machine;

integrate the mark bit and the allocation bit into a single mark/allocation bit at the space to free other spaces for other system functions;

correspond the mark/allocation bit with an object in a heap, wherein the mark/allocation bit occupies the single space, the mark/allocation bit to perform dual functions of the mark bit and the allocation bit by alternating between the mark bit and the allocation bit via the single space;

reset the mark/allocation bit, and switching the mark/allocation bit to the allocation bit to perform root set enumeration, wherein the performing of the root set enumeration comprises lazy and selective root set enumeration, wherein the lazy and selective root set enumeration comprises lazily and selectively identifying the root object in a segment of the heap and regenerating the allocation bits for the root object and other objects associated with the root objects residing in the segment of the heap;

reset the mark/allocation bit, and switching the mark/allocation bit to the mark bit to perform marking and scanning of objects using the identified object;

mark the identified object as a root object;

scan one or more objects associated with the root object by utilizing the mark/allocation bit as the mark bit;

mark the scanned one or more objects associated with the root object; and provide mark/allocation bit information being displayed at the client.

9. The machine-readable medium of claim 8, wherein the instructions which when executed, further cause the machine to perform the root set enumeration by utilizing the mark/allocation bit as the allocation bit to conduct pointer identification of the object in the heap.

10. The machine-readable medium of claim 8, wherein the instructions which when executed, further cause the machine to:

retain the marked root object and the marked one or more objects associated with the root object; and regenerate allocation bits for, the retained objects.

11. The machine-readable medium of claim 8, wherein the virtual machine comprises a Java virtual machine.

* * * * *